April 19, 1932.  C. F. BERAN  1,854,731
APPARATUS FOR CARRYING OUT CHEMICAL REACTIONS
Filed Jan. 16, 1928  4 Sheets-Sheet 1
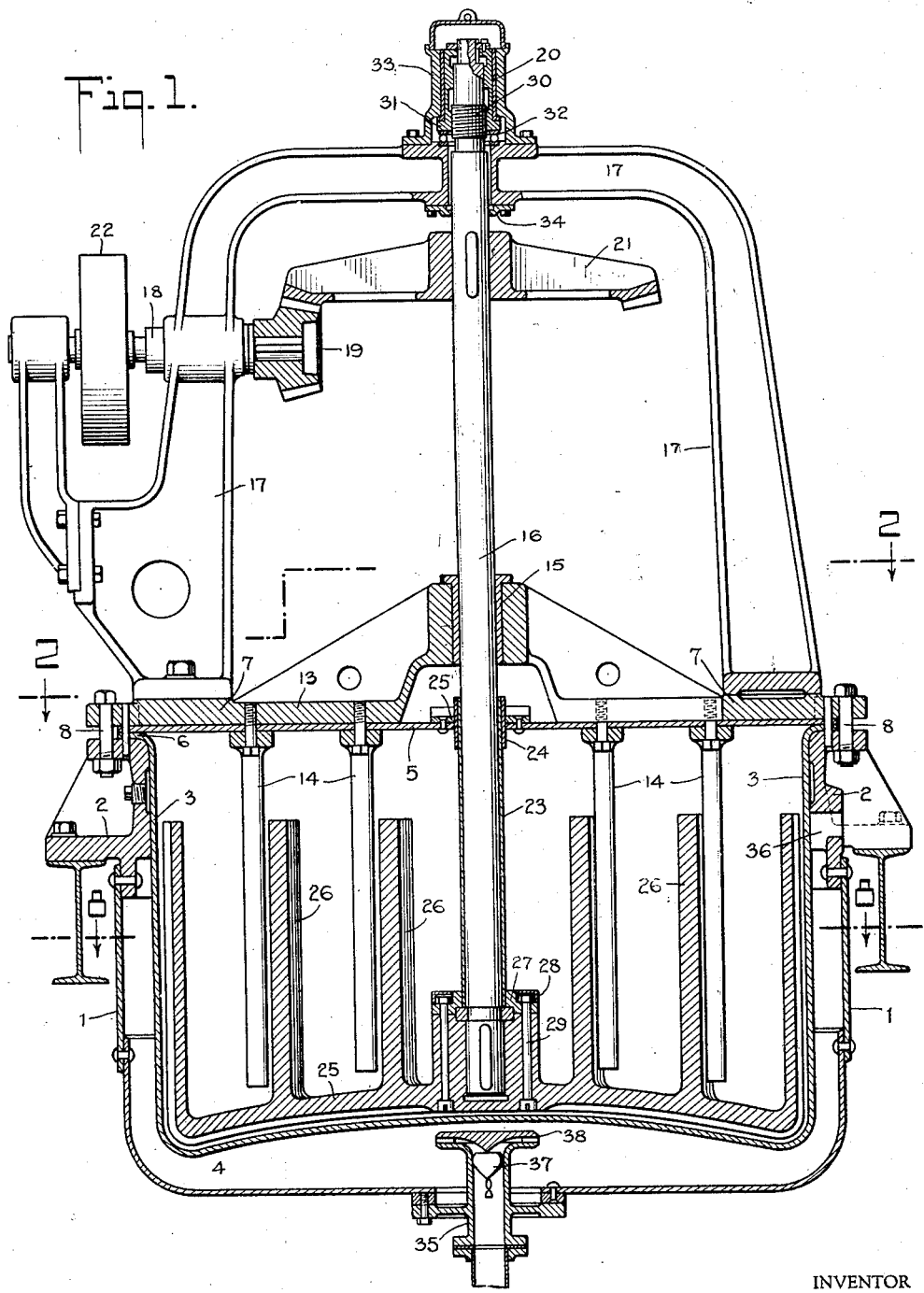
INVENTOR
CHARLES F. BERAN
HIS ATTORNEYS April 19, 1932.  C. F. BERAN  1,854,731
APPARATUS FOR CARRYING OUT CHEMICAL REACTIONS
Filed Jan. 16, 1928  4 Sheets-Sheet 2
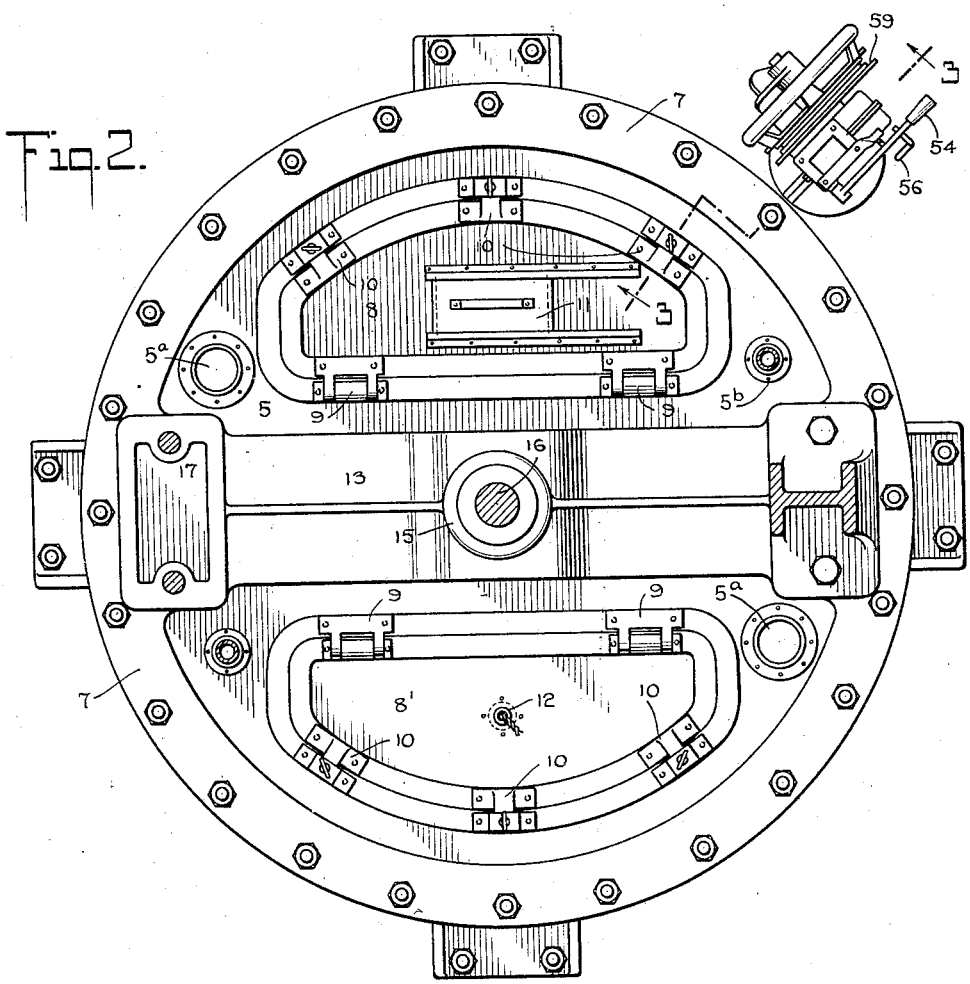
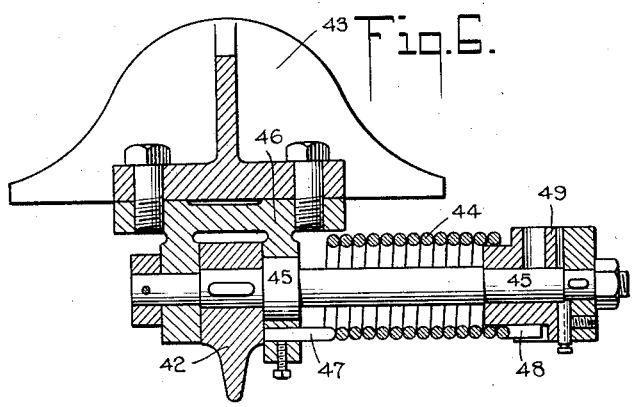
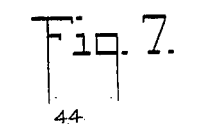
INVENTOR
CHARLES F. BERAN,
BY
HIS ATTORNEYS

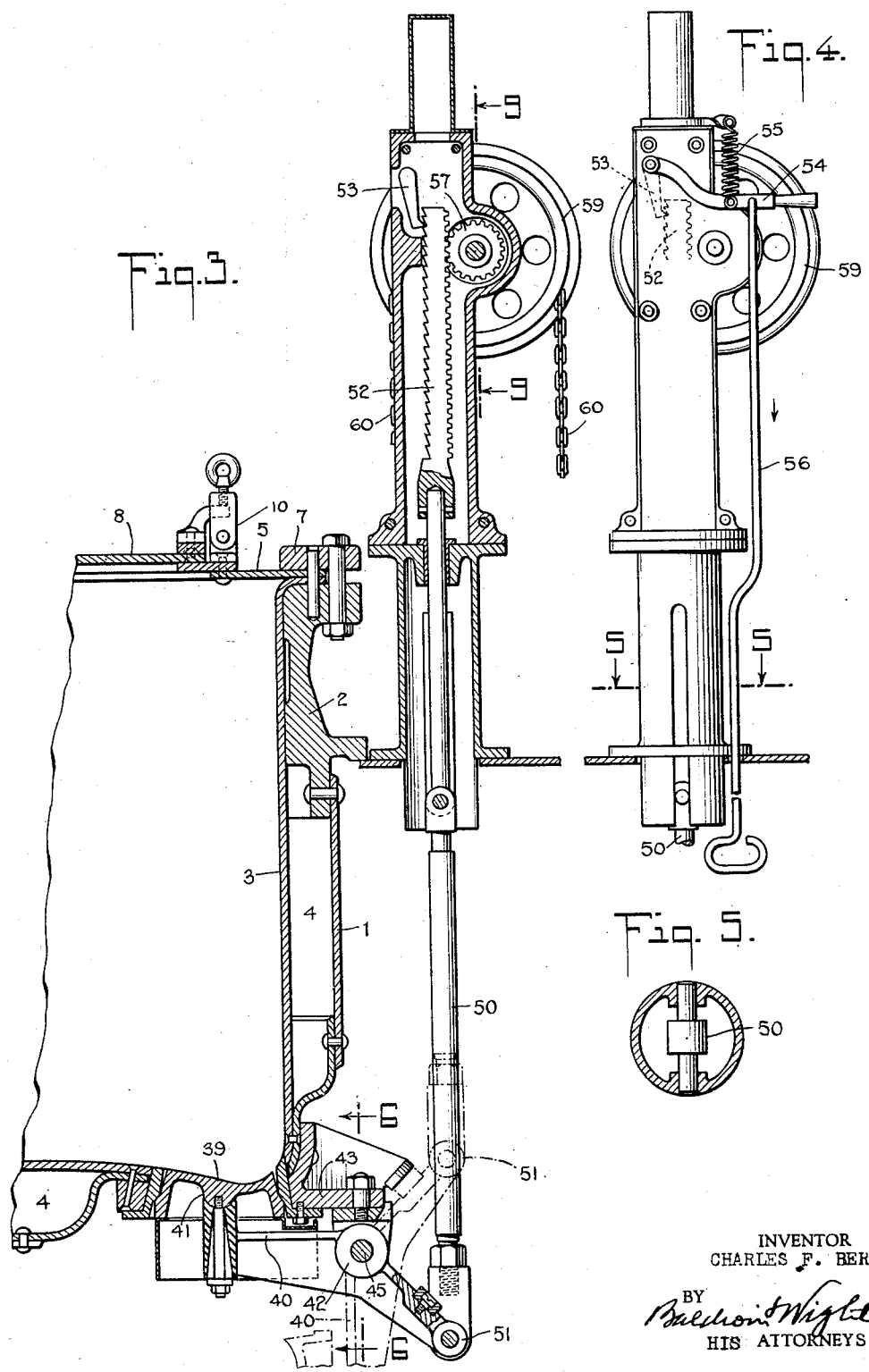

April 19, 1932. C. F. BERAN 1,854,731
APPARATUS FOR CARRYING OUT CHEMICAL REACTIONS
Filed Jan. 16, 1928 4 Sheets-Sheet 4
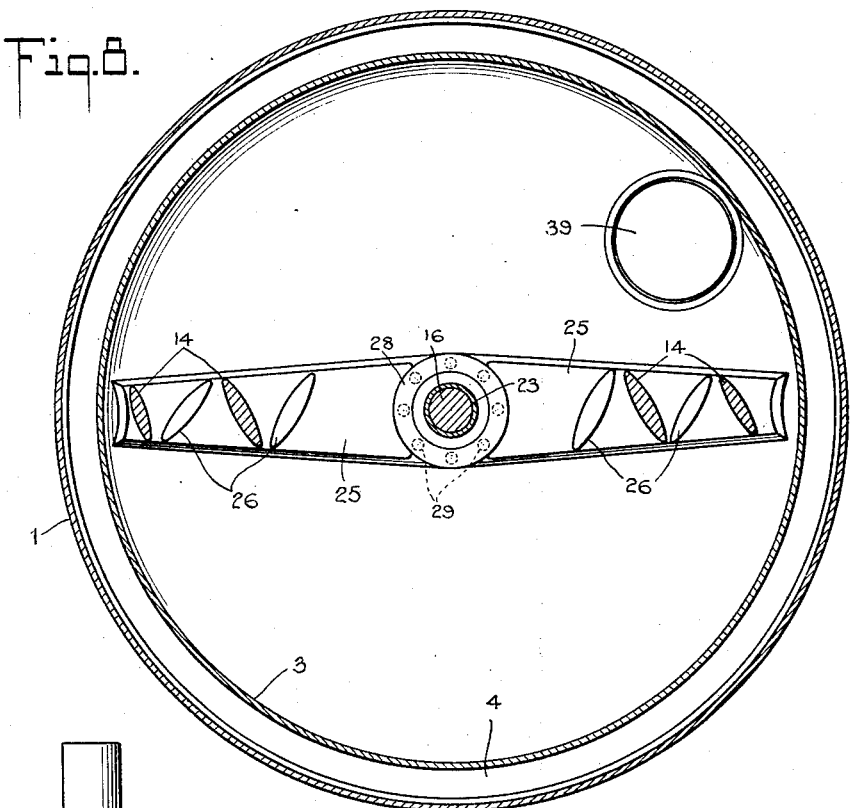
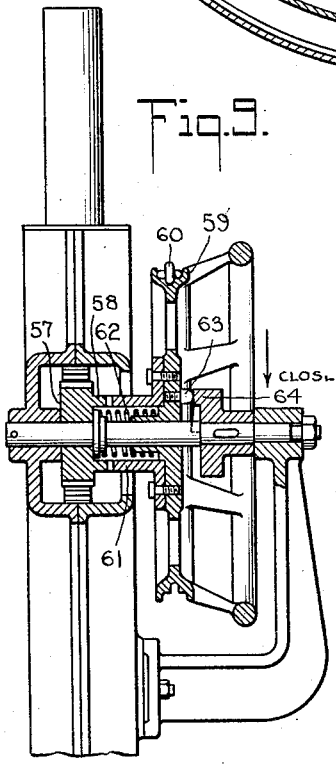
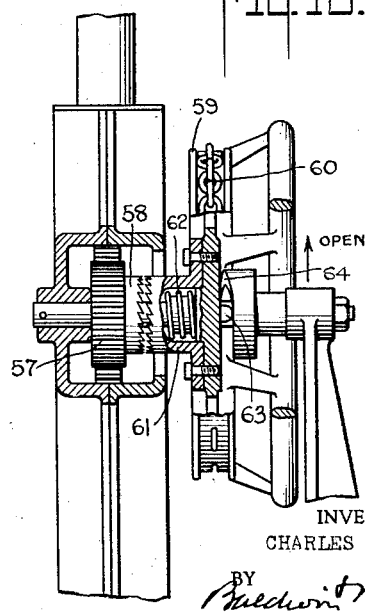
INVENTOR
CHARLES F. BERAN
HIS ATTORNEYS Patented Apr. 19, 1932

1,854,731

UNITED STATES PATENT OFFICE

CHARLES F. BERAN, OF DRUMMONDVILLE, QUEBEC, CANADA, ASSIGNOR TO CELANESE CORPORATION OF AMERICA, OF NEW YORK, N. Y., A CORPORATION OF DELAWARE

APPARATUS FOR CARRYING OUT CHEMICAL REACTIONS

Application filed January 16, 1928. Serial No. 247,232.

This invention relates to an apparatus for conducting operations wherein it is desired to agitate the material being treated and wherein it is desirable to control the temperature of the chemical reaction by means of a heat exchanging fluid.

An object of my invention is to provide an apparatus for carrying out chemical reactions under perfect control, and which apparatus provides for thorough mixing of the charge, is simple in construction and occupies little floor space.

Another object of my invention is to provide a jacketed apparatus provided with a stirring mechanism wherein leakage of the substance being treated is eliminated.

Another object of my invention is to provide an apparatus of this nature which may be easily dismantled for renewal of parts that have become defective.

A further object of my invention is to provide a mixing apparatus arranged in such manner that the charge may be quickly and easily removed.

A further object of my invention is to provide agitating means in a chemical apparatus which provides thorough agitation of the charge and which may control the direction of flow of the materials therein. Further objects of my invention will appear from the following detailed description.

In accordance with my invention I provide a jacketed vessel which may be entirely closed and which is provided with stirrers for thoroughly agitating the charge therein. The heat exchange fluid is introduced into the jacket in such a manner as to obtain complete dissemination of the same in the jacket without the formation of pockets. The stirrer is mounted in such a manner that it may be easily removed, and its height in the vessel easily adjusted. The vessel is provided with a quickly opening discharge valve at its bottom so as to permit the ready removal of the charge. This apparatus is suitable for carrying out any chemical transformations, but it is particularly suitable for the acetylation of cellulose. Referring to the accompanying drawings:—

Figure 1 is a vertical cross section view of the chemical treating apparatus.

Figure 2 is a horizontal cross section taken along the line 2—2 of Figure 1.

Figure 3 is a cross section of part of the apparatus taken along the line 3—3 of Figure 2, showing the discharge valve and its operating mechanism.

Figure 4 is an elevation of the valve operating mechanism.

Figure 5 is a cross section taken along the 5—5 of Figure 4.

Figure 6 is a cross section taken along the line 6—6 of Figure 3 on an enlarged scale showing the mounting of the valve operating lever.

Figure 7 is an elevation of the details shown in Figure 6.

Figure 8 is a cross section taken along the line 8—8 of Figure 1 showing the arrangement of the stirrer arms.

Figure 9 is a cross section taken along the line 9—9 of Figure 3 showing the clutch mechanism for closing the discharge valve, in closing position.

Figure 10 is a view similar to that of Figure 9 showing the clutch mechanism in opening position.

The outer shell 1 of the vessel is preferably made of steel and is riveted or otherwise fastened to the cast steel foundation ring 2. Within the outer shell 1 there is placed an inner shell 3, preferably made of some acid resistant material such as copper, thus leaving a space 4 for a cooling or heating medium. This inner shell 3 is riveted or otherwise secured at its top to the foundation ring 2. The cover 5 of the vessel is preferably made of acid resisting material such as copper and is held firmly against the horizontally flanged portion 6 of the inner shell by means of the clamping ring 7 through the bolts 8.

Referring to Figure 2 the cover 5 of the vessel is provided with openings closed by the manhole closures 8a and 8′. These closures 8a and 8′ are hinged to the cover 5 by the hinges 9 and may be securely locked by means of the latches 10, 10 against escape of vapors. The manhole closure 8a is provided with an auxiliary opening that may be closed by the sliding cover 11 to permit the inspection or withdrawal of a sample from the charge within the vessel. The manhole closure 8′ is provided with a vapor proof lighting fixture 12 for illuminating the interior of the vessel. The openings closed by the manhole closures are for charging solid materials to the vessel. The cover 5 is also provided with vapor outlets 5a for the discharge of vapors that may be formed within the vessel during the process, which outlets may lead to any suitable ventilating and/or vapor recovery system. The inlets 5b are provided in the cover for the introduction of acid or any other liquid into the treating vessel.

Referring more particularly to Figure 1, the clamping ring 7 is provided with a diametrical web 13 from which the stationary stirrer arms 14 are suspended. The clamping ring also supports the lower main bearing 15 for the stirrer shaft 16. To the clamping ring 7 there is bolted a yoke piece 17 which supports the bearings for the shaft 18 of the drive pinion 19 and the upper main and thrust bearing 20 of the stirrer shaft 16. The stirrer shaft 16 is rotated by means of the bevel gear wheel 21 keyed thereon, which in turn is driven by the pinion 19. Rotation is applied to the pinion 19 by means of a pulley 22 by any suitable prime mover. However, for reasons set forth below, a reversible electric motor is preferred as the source of power.

The stirrer arm shaft 16 is preferably of steel. To protect it against the action of acids, the part of the shaft within the vessel is surrounded by a copper tube 23 shrunk thereon. Where the shaft 16 comes through the cover 5, the copper tube 23 is protected by another thin copper tube 24 which acts as a wearing piece. To prevent escape of vapors or fumes from the vessel, a gland 25′ is provided at the point where the shaft protrudes through the cover 5.

To provide agitation of the material in the vessel, the rotating stirrer arm 25, made of acid resisting material, is keyed to the shaft 16. This stirrer arm is provided with the upstanding stirrers 26. These stirrers 26 are disposed at an angle different from that of the stationary stirrers 14. The lower part of the shaft 16 is protected against the action of acids in the vessel by means of a packing ring 27 held in place by the bronze through bolts 29 and the retaining cover 28.

The main upper bearing 20 for the stirrer shaft 16 is constructed so as to permit raising or lowering of the stirrer arm 25 to allow proper clearance between it and the bottom of the inner copper shell 3. For this purpose the shaft is screw-threaded at 30 engaging threads on the sleeve 31 which rests on the ball bearings 32. By this means the shaft may be raised or lowered at will. Ready access to the ball bearings 32 for the renewal of the same is obtained by the removal of the housing 33. The underside of the yoke 17 is provided with packing 34 to prevent the oil used for lubricating the upper bearings from running down the shaft.

The jacket 4, between the outer shell 1 and the inner shell 3, provides space for circulation of a heat exchange fluid. When a cooling liquid such as brine is used it enters by the inlet 35 and leaves by the outlet 36, placed at the upper end of the jacket in order to avoid air pockets. The cooling liquid enters the jacket 4 through the jets 38, constructed on the principle of an impeller as adopted for centrifugal pumps. The total area of the outlet jets 38 is smaller than the area of the inlet pipe 35, preferably about 25% less, so as to cause the cooling medium to leave the outlet jets at a high velocity and to impart a rotating motion to the cooling medium, thus increasing the heat transfer on account of the high velocity at which the cooling medium flows around the inner copper shell 3, and thus further completely eliminating the possibility of warm pockets being formed in the circulation space. In order to further obtain thorough dissemination of the cooling fluid, a vane 37 is provided in the inlet pipe 35 to impart a swirling motion to the incoming cooling fluid.

For discharging the contents of the vessel, the valve 39 is provided at the lowermost portion of the inner shell 3. The opening in the shell for this valve is clear and free of any obstructions, so as to permit the quick discharge of the contents of the vessel. The valve 39 is fitted and ground in place to the valve seat during construction in order to insure proper seating at all times. The valve seat is renewable, readily and at low cost. The valve 39 is secured to the lever 40 by the ball and socket arrangement 41. The lever 40 is pivoted at 42 on a bearing supported by the saddle 43 attached to the lower part of the treating vessel. The lever is actuated by a torsion spring 44 tending to swing the valve 39 in open position. Referring to Figures 6 and 7, the lever 40 is keyed to the shaft 45, which rotates in the bearing 46, supported by the saddle 43. The end 47 of the spring is secured against rotation by being fastened to the bearing 46. The other end of the spring is secured at 48 to the spring carrier 49, which in turn is keyed to the shaft 45.

Referring more particularly to Figures 3 and 4, the valve lever 40 is pivotally secured to the operating shaft 50 at 51. The shaft 50 is provided at its upper end with a rack 52 having one edge notched for engagement with a pawl 53. The pawl 53 is actuated by the trip lever 54 to which is attached the tension spring 55 in such a manner that the pawl 53 presses against the notches of the rack 52 to keep it locked. An operating rod 56 is attached to the trip lever 54. It will thus be seen that if the operator pulls the rod 56 from the lower floor, or pushes the trip lever 54 from the operating platform, the ratchet pawl 53 will be released and the shaft 50 will fly upwards, thus opening the valve 39 due to the action of the torsion spring 44.

For closing the valve 39 the following mechanism is provided.—Referring to Figures 3, 9 and 10, the rack 52 is provided with teeth, meshing with the pinion 57 which has the toothed sleeve 58 attached thereto. A wheel 59 actuated by the chain 60 is mounted on a shaft and has a toothed sleeve 61 corresponding to the sleeve 58. The two sleeves are held normally apart by the action of the spring 62. A projection 63 is provided on the chain wheel 59 which bears against the stationary cam 64. The operation of this construction is as follows.—Assuming the valve 39 is in open position, the valve closing mechanism will then have the position shown in Figure 10. The chain 60 is then pulled so that the wheel 59 rotates in such a direction that by the action of the cam 64 on the projection 63, the wheel is forced to the left and thus engages the pinion 57 through the clutch mechanism as shown in Figure 9. On further rotation of the chain wheel, the pinion 57 rotates with it and forces the rack 52 down, thus closing the valve 39. In case the chain is released prior to complete closing of the valve, the ratchet pawl 53 will hold the rack in position and not permit it to fly back, while the chain wheel 59 will become disengaged from the pinion 57 due to the action of the spring 62. However, to complete the closing of the valve, it is merely necessary to again rotate the chain wheel 59. Likewise the valve 39 is held completely closed through the action of the pawl 53. The valve can either be closed by rotating the chain wheel from the operating platform or by pulling the chain from the ground floor.

The operation of the apparatus will now be described.—As stated before, this apparatus may be for any purpose where mixing and/or heating or cooling is necessary. Merely as an illustration of one use to which it may be applied, its use for acetylating cellulose will be described.—The valve 39 being closed, the manhole covers 8a and 8' are opened and a charge of cellulosic material, such as cotton or wood pulp is dumped into the vessel. The manhole covers are then securely latched and a charge of a mixture of acetic acid, acetic anhydride and sulphuric acid is introduced through the inlets 5b. In the meantime cold brine is introduced through the pipe 35 and passing the vane 37 has a swirling motion imparted thereto and enters the jacket 4 through the jets 38 at a high velocity. The brine leaves the jacket through the outlet 36. Thus a uniform cooling of the inner shell 3 is efficiently secured. The stirrer mechanism is now operated in a clockwise direction, thus forcing the charge out against the jacket, where it is cooled. However, when it is found that the temperature of the charge is becoming too low, the motor driving the stirrer shaft is reversed so as to cause the stirrer to rotate in counter clockwise direction, thus drawing the charge away from the jacket and concentrating it towards the center so as to diminish the cooling effect. Any vapors or fumes that are formed during the process are conducted away from the pipes 5a to a suitable ventilating and/or vapor recovery system, thus preventing losses and protecting the operators and adjacent machinery from the action of these fumes. The progress of the acetylation is observed by sliding open the cover and taking samples of the charge, and also by observing the material in the vessel, this being possible because of the light provided by the vaporproof lighting fixture 12. After the acetylation is completed the handle 56 is pulled, thus releasing the pawl 53 and permitting the rod 50 to fly upwards thus quickly opening the valve 39 so as to permit the free discharge of the material into a vessel placed thereunder. The position of the lever 40 when the valve 39 is opened is shown on dotted lines in Figure 3. The valve 39 may be closed for the next charge by pulling the chain 30 which rotates the wheel 59 and the pinion 57 which actuates the rack 52 of the shaft 50.

The stirrer mechanism above described is claimed broadly in my co-pending application No. 272,848, filed April 25, 1928.

It is to be understood that the foregoing details are merely given by way of illustration and that many variations may be made therein without departing from the spirit of this invention.

Having described my invention what I claim and desire to secure by Letters Patent is:

1. In apparatus for carrying out chemical reactions, the combination with a closed vessel, of a rotatable shaft projecting through the top of said vessel, a stirrer arm within said vessel carried by said shaft, a bearing member in which said shaft is journaled and means comprising a screw threaded sleeve carried by said bearing member for raising or lowering said shaft whereby the clearance between the stirrer arm and the bottom of the vessel may be adjusted.

2. In apparatus for carrying out chemical reactions, the combination with a closed vessel, of a rotatable shaft having a threaded portion projecting through the top of said vessel, a stirrer arm within said vessel carried by said shaft, a bearing member in which said shaft is journaled and means comprising a screw threaded sleeve carried by said bearing member and co-operating with the threaded portion of said shaft for raising or lowering said shaft whereby the clearance between the stirrer arm and the bottom of the vessel may be adjusted.

3. Apparatus for carrying out chemical reactions comprising a vessel, a yoke carried thereby, a bearing member mounted on said yoke, a rotatable shaft having a threaded portion journaled in said bearing member, a stirrer arm within said vessel fixed to said shaft and means for raising or lowering said shaft whereby the clearance between the stirrer arm and the bottom of the vessel may be adjusted, said means comprising a screw threaded sleeve carried by said bearing member and adapted to co-operate with the threaded portion on said shaft.

In testimony whereof I have hereunto subscribed my name.

CHARLES F. BERAN.